United States Patent Office 3,453,097
Patented July 1, 1969

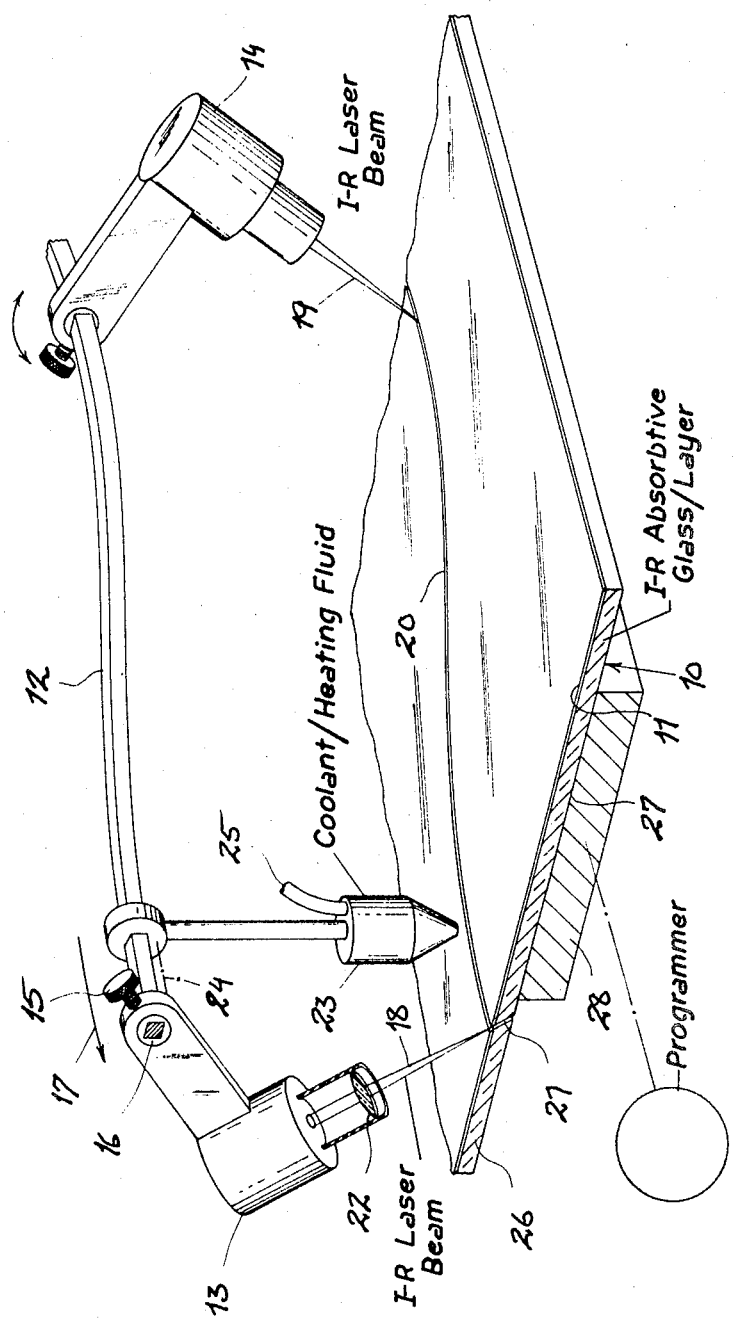

3,453,097
METHOD OF WORKING GLASS WITH ABSORBENT BY A LASER BEAM
Walter Häfner, Wettingen, Switzerland, assignor to Gerhard Mensel Glasbearbeitungswerk, Braunschweig, Germany, a company of Germany
Filed Oct. 18, 1965, Ser. No. 497,326
Claims priority, application Germany, Oct. 19, 1964, M 62,803
Int. Cl. C03b 21/00, 9/46
U.S. Cl. 65—112    4 Claims

ABSTRACT OF THE DISCLOSURE

A method of cutting glass, especially the tinted blue-green transparent glasses used for transparency and slide-cover glasses wherein the glass sheet is moved continuously past a continuous laser beam which is focused upon the glass sheet. The laser and absorptive characteristics and parameters are selected so that the glass absorbs the laser energy and converts it into sufficient heat to enable separation of the sheet into pieces along the line swept by the laser beam.

My present invention relates to the working of glass and, more particularly, to an improved method of and apparatus for the cutting of glass and the fusion thereof.

In the glass industry, it has been common practice heretofore to sever sections of sheet glass with the air of roller-type glass cutters or pointed scribers of diamond or other material harder than glass which score the latter so that a slight bending along the scoring will cause a more or less clean break therealong. This method is applied not only to sheet glass but also to glass of other configurations and has some significant disadvantages. Firstly, the use of scribed lines results in splintering of the glass along the break and can be used only when the break line is substantially rectilinear. Secondly the break face runs perpendicularly to the scribed surface. It is therefore, not always possible to use these techniques when a perfectly clean separation of the pieces is desired, when it is necessary that the parting surface lie at an angle to the outer face of the glass, or when the separation is to be made along intricately curved lines. Indeed, the glass edges must often be treated after cutting by, for example, polishing and like steps to eliminate the tiny splinters of glass and any irregularities in the parting surfaces. Such subsequent treatments are expensive and are not suitable, therefore, for the manufacture of relatively inexpensive massproduced articles such as transparency cover glasses, slide glasses or the like. It has been proposed to provide abrasive systems for severing glass along curved lines and in more intricate patterns than can be produced by scoring although these processes also have not attained wide-spread use because they must be carried out predominantly by hand and have not been satisfactory for most purposes. Drilling techniques and the like can, moreover, not be used except for circular cutting.

It is, therefore, the principal object of the present invention to provide a relatively economical method of working glass and especially cutting glass along both straight and curved lines which will obviate the disadvantages of the conventional systems discussed above.

It is another object of the invention to provide an economical and highly adaptable system for the severing of glass and the joining of pieces thereof which is capable of intricate and fine manipulation and control.

These objects and others which will be apparent hereinafter are attained in accordance with the present invention which is based upon my surprising discovery that high-energy-density or concentrated laser beams can, under certain circumstances be employed to cut glass and join together pieces thereof in spite of the general belief that glass remains unaffected in a physical sense when transluminated by a laser beam. The term "laser" is used in its general sense to indicate a beam of concentrated coherent light generated by stimulation of an emitter such as a ruby, neodymium-doped or cesium-doped emitters subjected to pumping with xenon-lamp sources or the like It has been suggested to employ laser beams for the piercing of metal which absorbs the beam and apparently converts the energy thereof into sufficient heat to raise the temperature of the irradiated body to its melting point. In these arrangements, lenses and the like, composed of glass, were used to focus the beam and it was supposed that glass, which is transparent to many laser beams, was totally unaffected thereby. I have, however, found that a high-energy laser beam can be used to cut glass along straight lines or highly intricate contours when the wavelength of the coherent radiation emitted by the laser is selected so that it corresponds to an absorption frequency of the glass; the latter may then have a color or be provided with a color layer in the visible or nonvisible range, in accordance with the present invention, such that the light of the laser frequency is substantially completely absorbed.

The term "laser" represents an abbreviation of the expression "light amplification through stimulated emission of radiation" and will hereinafter be used in its more common sense to describe a transducer capable of converting coherent or incoherent electromagnetic radiation in the visible or nonvisible parts of the spectrum (e.g. light or microwave) to a coherent narrow pencil of continuous or intermittent light of high energy density, preferably in the infrared range.

According to one aspect of the present invention, the laser and the glass sheet or body are relatively displaced to sweep the continuous laser beam along the glass whose light-absorption qualities are so designed, with respect to the wavelength of the coherent beam, that the swept line is so strongly heated that a cutting of the glass sheet is effected. The beam, which is advantageously focused to a point on the glass body, can be used to cut the latter in any one of several ways. I have found that it is possible to use the beam to heat a selected level of the glass, in accordance with the level of focus, to a temperature less than that at which the glass is softened or flowable and then to follow the laser beam with a cooling of the glass whereupon a break is effected along the line swept by the pointshaped cutting rays with clean edges and without danger of spurious fracture. Alternatively, it is possible to adjust the energy of the beam, the degree of light absorption by the glass and/or the rate at which the beam and the glass are relatively displaced in such manner that the localized heating by the laser is sufficient to cut through the glass by raising it to a temperature approximating the melting point. It has been found, for example, that ordinary tinted blue-green glasses of the type commonly used for window panes, cover glasses of slides or transparencies, and the like absorb sufficient energy from an infrared laser beam to permit development of the heat necessary for such types of cutting. In some cases, it may be desirable to provide a light tap or a small degree of bending to separate the two sections.

I have, moreover, discovered that it is possible to operate with glasses whose light-absorptive characteristics are relatively unsatisfactory in that the amount of heat absorbed is meager. It appears that, when a subsequent cooling operation is used, the temperature to which the glass is raised is not nearly as significant as the temperature differential developed across the thickness of the glass. The laser beam, for example, can be focused at the upper surface of the glass and is capable of developing a temperature gradient therein transversely to the laser path, which is effective to permit separation of the pieces of glass along this path presumably because of the very narrow breadth of the beam and the short time in which heat can be developed. It is, therefore, an important characteristic of this invention that the laser beam is required to generate a temperature gradient, upon cooling of the laser path, such that tapping of the glass sheet or slight bending thereof will result in substantially unhindered separation of the pieces. If the glass coloration is selected so that most of the laser energy is absorbed, then it is possible to use a relatively low-power laser, whereas higher powers are required if the laser beam is less strongly absorbed. It is, therefore, an important feature of this invention to provide means for modifying the absorptive characteristics of the glass; I therefore provide for the incorporation in the glass, upon its manufacture or the subsequent coating thereof, of an infrared-absorptive material which, however, is substantially invisible to the eye with normal illumination. Such infrared-absorbing materials are known in the art and need not be described. The dyestuffs may be coated onto the glass as well.

With the cutting system described above wherein a laser beam is followed by cooling of the glass and/or the glass is separated by tapping or bending, the parting face lies perpendicular to the glass surfaces. It is, however, possible to ensure that the separating surfaces will be inclined or beveled with respect to the glass surfaces and the present invention thus provides for the direction of the laser beam at an angle to the glass sheet as it is swept therealong with an intensity and a glass-absorption coefficient sufficient to permit the laser beam to cut cleanly through the glass layer. In this case, the temperature of the glass along the very narrow laser path will be higher than the melting temperature of the glass. The latter is concurrently polished by a sort of "fire polishing" which results in a smooth separation face. I have found that it is advantageous from the point of view of the attainability of higher cutting speeds and/or the use of smaller laser energies to preheat the glass prior to the treatment thereof with the laser beam. The preheating reduces the tendency of heat to be conducted away from the cutting line. To carry away melted portions of the glass along the laser path, a gas stream can be directed at the glass behind the laser. The gas, advantageously, has a temperature higher than room temperature to reduce the conduction of heat away from the cutting zone, and even above the melting point of the glass so that heat polishing can be effected by the gas stream to yield an especially clean and smooth separation. If is also contemplated, in accordance with the invention, to simultaneously treat the glass sheet with one or more laser beams at the same time along separate paths or a common path, the latter method being used when the parting faces of the glass are to be beveled in opposite directions substantially concurrently. Furthermore, this method is capable of yielding grooves or other modified edge configurations, as will be readily apparent hereinafter. The cutting operation can be carried out along straight or curved lines with either the glass sheet or the laser sources being displaced. Moreover, when glass plates are brought together along the path of the laser beam, the heat generated thereby may be made sufficient to fuse them together.

The above and other objects, features and advantages of the present invention will become more readily apparent from the following description, reference being made to the accompanying drawing in which the sole figure is a perspective view of an apparatus for cutting glass according to this invention.

In the drawing I show somewhat diagrammatically a glass sheet 10 containing an infrared-absorptive agent or coated at 11 with an absorbent layer for infrared illumination. The glass sheet 10, 11 can be stationary or movable with respect to a guide rail 12 forming a transport path for a plurality of laser housings 13, 14. These housings may be mounted on the rail 12 at adjustable angles with respect to the glass plate 10 by means of a locking screw 15 and a bearing 16 keyed to the rail 12. The angular position of each housing 13, 14 is thus maintained as the laser housings are shifted along the rail in the direction of the arrow 17. As indicated in the figure, the successive housings 13 and 14, shifted along a single transport path, have their respective laser beams 18, 19 inclined oppositely with respect to the glass plate 10 along the same parting line 20. The parting faces 21 etc. are thus beveled in opposite directions, the bevel being maintained on the finished piece for decorative purposes or to provide undercuts by means of which the glass sections can be retained in, for example, frames, transparency holders or the like or by means of which the glass articles can retain other elements. It is evident that the illustrated apparatus can be adjusted so that the laser beams are perpendicular to the glass surface in which case the parting faces 21 etc. will extend perpendicularly to the surface of the glass sheet. Each laser housing 13, 14 can contain a ruby laser or the like of conventional construction together with pumping lamps (e.g. of Xenon type). This construction is well known and requires no specific illustration. The laser is operated preferably in its infrared mode so that the coherent beams 18 and 19 have wavelengths in the range from, say, 6800 A. through about 7000 A. and above. A lens system represented at 22 can be provided to focus the laser beams 18 and 19 substantially to a point on the glass sheet 10, the lens systems having no material infrared absorption. In the event it is desired to exploit the effects of temperature differentials as produced by the laser beams for breaking the glass along the path swept by the beam, a coolant of fluid may be dispensed rearwardly of the laser beam from, for example, a nozzle 23 carried by the track 12 and coupled with the laser beam as indicated at 24. The duct 25 supplies a coolant gas or liquid to the nozzle.

In the event it is desired to employ a heated gas stream according to the invention as previously described, the nozzle 23 can be supplied with hot air via the duct 25; thus the nozzle 23, when trained on the point at which the laser beam impinges on the glass sheet can be used to direct a fluid at a temperature less than the softening point of the glass along the cutting line 20 to sweep away glass melted by the laser beam; the energy of the latter is then absorbed by the glass to a substantially greater extent than is required for exploitation of the temperature-differential effect. When the temperature of the gas is above the softening point it serves to "fire polish" the parting surfaces and indeed to reduce the output required of the laser. When the assembly 23, 13 is shifted to the right, the hot gas can be used to preheat the cutting zone. At any rate the laser beam serves to separate the glass sheet into distinct portions 26, 27 along the parting line 20 which may be closed to produce holes in a sheet, curvilinear or straight as desired. If the laser heads 13, 14 are held stationary, glass sheet 10 can be severed in strips by moving it linearly on its carrier 28; the sheet can be provided with arcuate incisions by a corresponding displacement of the support 28 while laser heads 13 and 14 are stationary. It is evident that this more complex movement of the support can be carried out via templates, cams and like programming devices automatically coupled with the support 28 via servo mechanisms, electronic couplings, mechanical links and/or via memory devices such as perforated tapes, audio-frequency devices, analog or digital devices and the like. In fact, several apparatuses of the character described can be operated concurrently via means of the latter type. The assembly has the advantage that it yields, precise separations in a clean and rapid manner without wear of cutting tools and accompanying problems.

I claim:

1. A method of cutting transparent sheet glass, comprising the steps of continuously sweeping a laser beam across a surface of a glass sheet to describe a line therealong, said beam consisting of coherent light of a wavelength in a range substantially between 6800 and 7000 A., said glass sheet being tinted with a color absorbing radiation in said range to develop heat localized along said line; and separating said sheet along said line.

2. The method defined in claim 1, further comprising the step of preheating said glass sheet to a temperature below the melting point thereof prior to sweeping said beam thereacross.

3. The method defined in claim 1, further comprising the step of directing a gas jet at a temperature in excess of ambient temperature onto the glass sheet along said line after heating by said beam to clear molten glass from said line and help separating said sheet.

4. The method defined in claim 1, further comprising the step of sweeping a further, similar laser beam of wavelength within said range across said surface along said line but with an inclination to said surface different from that of the first-mentioned beam whereby the parting faces of pieces of the sheet separated along said line are inclined at different angles to said surface.

References Cited

UNITED STATES PATENTS

| | | | |
|---|---|---|---|
| 1,194,124 | 8/1916 | Barrow | 65—112 |
| 3,214,563 | 10/1965 | Ford. | |
| 3,217,088 | 11/1965 | Steierman. | |
| 3,265,855 | 9/1966 | Norton. | |
| 3,304,403 | 2/1967 | Harper. | |

FOREIGN PATENTS 608,711  3/1962  Belgium.

OTHER REFERENCES

Electronics, McGraw-Hill Weekly, July 5, 1963, pp. 23–27.

S. LEON BASHORE, *Primary Examiner.*

F. W. MIGA, *Assistant Examiner.*

U.S. Cl. X.R.

83—7; 65—113, 120, 133, 162, 174, 269, 272